(12) United States Patent
Cardente

(10) Patent No.: US 7,254,685 B1
(45) Date of Patent: Aug. 7, 2007

(54) METHOD FOR MAINTAINING HIGH PERFORMANCE WHILE PRESERVING RELATIVE WRITE I/O ORDERING FOR A SEMI-SYNCHRONOUS REMOTE REPLICATION SOLUTION

(75) Inventor: John Cardente, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 412 days.

(21) Appl. No.: 10/868,266

(22) Filed: Jun. 15, 2004

(51) Int. Cl.
  *G06F 12/16* (2006.01)
(52) U.S. Cl. .................. 711/162; 711/169; 707/201
(58) Field of Classification Search .............. 711/162, 711/169; 707/201
  See application file for complete search history.

(56) References Cited

U.S. PATENT DOCUMENTS

| | | | |
|---|---|---|---|
| 5,220,653 A | 6/1993 | Miro | 718/107 |
| 5,469,560 A | 11/1995 | Beglin | 711/112 |
| 5,504,861 A * | 4/1996 | Crockett et al. | 714/13 |
| 5,592,618 A * | 1/1997 | Micka et al. | 714/54 |
| 5,603,063 A | 2/1997 | Au | 710/52 |
| 5,615,329 A * | 3/1997 | Kern et al. | 714/6 |
| 5,734,818 A * | 3/1998 | Kern et al. | 714/20 |
| 6,105,078 A * | 8/2000 | Crockett et al. | 710/18 |
| 6,141,707 A | 10/2000 | Halligan et al. | 710/36 |
| 6,170,042 B1 | 1/2001 | Gaertner | 711/158 |
| 6,311,256 B2 | 10/2001 | Halligan et al. | 711/158 |
| 6,378,036 B2 | 4/2002 | Lerman et al. | 711/112 |
| 6,415,292 B1 * | 7/2002 | Kamvysselis | 707/10 |
| 6,487,562 B1 | 11/2002 | Mason, Jr. et al. | 702/205 |
| 6,665,740 B1 | 12/2003 | Mason, Jr. et al. | 710/6 |
| 6,691,115 B2 * | 2/2004 | Mosher et al. | 707/10 |
| 6,721,789 B1 | 4/2004 | DeMoney | 709/219 |
| 6,754,897 B1 | 6/2004 | Ofer et al. | 718/103 |
| 6,839,817 B2 | 1/2005 | Hyde, II et al. | 711/154 |
| 6,871,011 B1 | 3/2005 | Rahman et al. | 386/125 |
| 2004/0044865 A1 * | 3/2004 | Sicola et al. | 711/162 |

* cited by examiner

*Primary Examiner*—Brian R. Peugh
*Assistant Examiner*—Jared Rutz
(74) *Attorney, Agent, or Firm*—BainwoodHuang (57) ABSTRACT

A remote replication solution for a storage system receives a stream of data including independent streams of dependent writes. The method is able to discern dependent from independent writes. The method discerns dependent from independent writes by assigning a sequence number to each write, the sequence number indicating a time interval in which the write began. It then assigns a horizon number to each write request, the horizon number indicating a time interval in which the first write that started at a particular sequence number ends. A write is caused to be stored on a storage device, and its horizon number is assigned as a replication number. Further writes are caused to be stored on the storage device if the sequence number associated with the writes is less than the replication number.

27 Claims, 12 Drawing Sheets

| 38 ↙ | 40 ↙ SEQUENCE NUMBER | HORIZON NUMBER ↙ 42 |
|---|---|---|
| WRITE DATA | 0 | 4 |
| WRITE DATA | 0 | 4 |
| WRITE DATA | 1 | 6 |
| WRITE DATA | 3 | 7 |
| WRITE DATA | 5 | 11 |
| WRITE DATA | 7 | 11 |
|  |  |  |

32

|  |  |  |
|---|---|---|
|  |  |  |
|  |  |  |
|  |  |  |
|  |  |  |
|  |  |  |

METHOD FOR MAINTAINING HIGH PERFORMANCE WHILE PRESERVING RELATIVE WRITE I/O ORDERING FOR A SEMI-SYNCHRONOUS REMOTE REPLICATION SOLUTION

FIELD OF THE INVENTION

The present invention relates generally remote data replication, and more particularly to a remote replication solution that improves application performance.

BACKGROUND OF THE INVENTION

Many applications maintain persistent state information by storing data on disk. Often the data stored on disk is designed to allow an application to return to the same state after an unexpected restart. The ability of an application to reliably return to a previous state often depends on data being stored to disk in a specific order. In order to protect against data loss and business interruption due to disasters, application data is often replicated to a geographically remote site. Ideally the remote location is far enough away from the primary data center to ensure that a single disaster will not be able to destroy both data centers. In the event of a disaster, the remote copy of data can be used to either reconstruct a new primary data center or restart the affected applications at the remote location itself. In order for an application to be restarted at the remote site and return to its pre-failure state, data must be copied to the remote site in the appropriate order.

More particularly, to ensure that they can return to the same state, applications strictly control the order in which state information is written to disk. Typically, I/O requests to store new state information to disk are not issued until I/O operations to store previous state information have completed. Such write operations are said to be dependent on the previous write requests. Applications rely on this explicit control of dependent write ordering to ensure that there will be no gaps or misordering of the state information stored on disk. In order to guarantee that this strict write ordering occurs, disk storage systems must store write data to disk in the order that it is received. Furthermore, where remote copies of data are maintained ("remote replication"), the same write ordering restrictions exist. Some advanced storage systems are capable of performing remote replication automatically in a manner transparent to applications. Such solutions relieve critical applications from the burden of managing the remote data copy and allow them to focus on performing their particular business function.

At present, there are two primary methods to reliably maintain a remote copy suitable for application restart; synchronous and semi-synchronous remote replication. In accordance with the synchronous remote replication method, each write received is simultaneously applied to both the local disks and the remote disks. In order to ensure correct ordering of dependent writes, storage systems typically only allow one write to occur at a time and do not complete a write operation until the remote copy has been updated. Since write requests are not completed until the remote copy has been updated, the average latency of each write operation is increased to the time required to update the remote copy. That amount of time depends on, amongst other things, the geographic distance between the source of the request and the remote system, as well as the speed of the link between the two. Generally, the greater the distance, the longer the latency. This increased latency combined with the serial restriction needed to ensure the correct ordering of dependent writes can have a significant impact on application performance. As a result, it is difficult to construct geographically diverse disaster recover solutions using a synchronous replication solution while maintaining acceptable application performance.

In accordance with the semi-synchronous remote replication method, write operations are allowed to complete locally before the remote copy has been updated. Doing so decouples the application from the latency of updating the remote copy and thereby attempts to avoid the associated performance penalties. However, in order to ensure that the remote copy remains consistent, the writes must still be applied to the remote copy in the order that they were received. Typically storage systems accomplish this by storing writes that need to be applied to the remote copy in a queue. Sometimes, to control how out of date the remote copy gets, a maximum length for this queue is defined that, when reached, causes the replication to fall back to a synchronous behavior. When this happens, application performance is negatively impacted just as it would with a purely synchronous solution.

While semi-synchronous solutions offer better performance than synchronous ones, they can still result in a stricter than necessary ordering of writes. In general, not every write issued by an application is a dependent one. Therefore there are some writes that could be allowed to complete in parallel. In practice, it is difficult for storage systems to distinguish between dependent and non-dependent writes. Therefore, semi-synchronous solutions must default to ordering all writes in order to maintain correctness. In doing so, however, the overly strict serialization of writes that this causes may lead to the ordering queue quickly reaching its maximum length and the application performance degradations that result.

Both the synchronous and semi-synchronous solutions negatively impact application performance due to their strict serialization of writes. There is a need for an improved remote replication solution to allow better application performance while guaranteeing that the remote copy of application data remains consistent with the original, to ensure that the remote site can be used for application restart and failover in the event of a disaster.

SUMMARY OF THE INVENTION

In accordance with the invention, a remote replication solution is provided that significantly improves application performance. The remote replication method receives a stream of data including independent streams of dependent writes. The method is able to discern dependent from independent writes. The method causes writes from independent streams to be stored on a storage device in parallel until a dependent write in a stream needs to be stored on the storage device. The method discerns dependent from independent writes by assigning a sequence number to each write, the sequence number indicating a time interval in which the write began. It then assigns a horizon number to each write request, the horizon number indicating a time interval in which the first write that started at a particular sequence number ends. A write is caused to be stored on a disk drive if the sequence number associated with the write is less than the horizon number. The method waits until all outstanding writes complete if the sequence number associated with the write is greater than the horizon number before issuing another write to disk.

Similar computer program and apparatus are provided. In this manner the invention distinguishes dependent from independent writes and is able to parallelize some writes, thus resulting in application performance improvement.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

In accordance with the principles of the invention, there is provided a method for remote replication that allows a storage system to distinguish between dependent and independent writes in real-time. The method of the invention could be used to enhance a standard semi-synchronous remote replication solution to allow independent writes to be performed in parallel, thereby avoiding the overly strict serialization that would otherwise occur while at the same time maintaining consistency.

Figure 1:
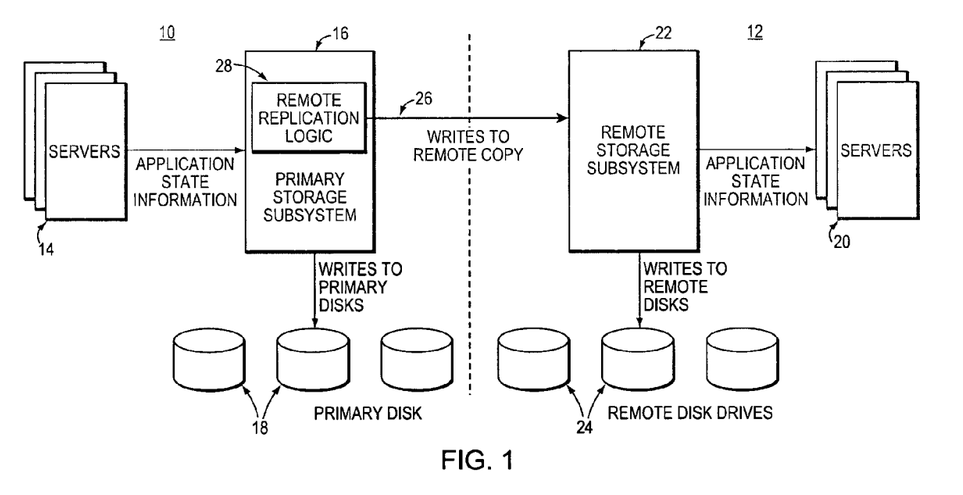
FIG. 1 is a representation of a primary data center that employs remote replication to a remote data center.

Referring to FIG. 1, there is shown an example of a primary data center 10 that employs remote replication to a remote data center 12. The remote data center 12 may be located many miles from the primary data center 10. As seen, one or more servers 14 reside at the primary data center 10. The servers 14 are coupled to a storage system 16 including disk drives 18. These servers may run critical applications for a business such as a financial institution, a manufacturing facility, a telecom company or the like. The remote data center 12 also includes one or more servers 20 and a storage system 22 including disk drives 24. The servers 14 and storage system 16 at the primary data center 10 are coupled to the storage system 22 at the remote data center 12 via the connection 26. The connection 26 may be any number of types of network connections, e.g. Ethernet, ATM channel, T1 line, or any number of types of I/O channel connections, e.g. Fibre Channel, SCSI.

Application state information is stored by the servers 14 at the primary data center 10 on the disk drives 18 so that, if some failure occurs in a server or part of the storage system, the application(s) can be restarted and their state recovered. Also included in the storage system 16 is remote replication logic 28. The remote replication logic 28 causes the application state information to be copied to the disk drives 24 at the remote data center. This is done so that if a disaster occurs at the location of the primary data center 10 that destroys the servers 14 and/or storage system 16, 18, or renders the system completely inoperable, the copy of the application state information at the remote data center 12 can be used to restart the application(s) at the remote location.

Applications strictly control the order in which state information is written to disk to ensure that they can return to the same state in the event of a failure. Typically, I/O requests to store new state information to disk are not issued by an application until I/O operations to store previous state information have completed. Such write operations are said to be dependent on the previous write operations. Applications rely on this explicit control of dependent write ordering to ensure that there will be no misordering of the state information stored on disk. In order to guarantee that strict write ordering for each dependent write stream occurs, disk storage systems must store dependent write data to disk in the order that it is received. However, multiple dependent write streams are often issued by an application, each stream being independent of the others. The independent streams can be stored to disk in parallel, as long as the dependent writes of each individual stream are strictly ordered.

Figure 2:
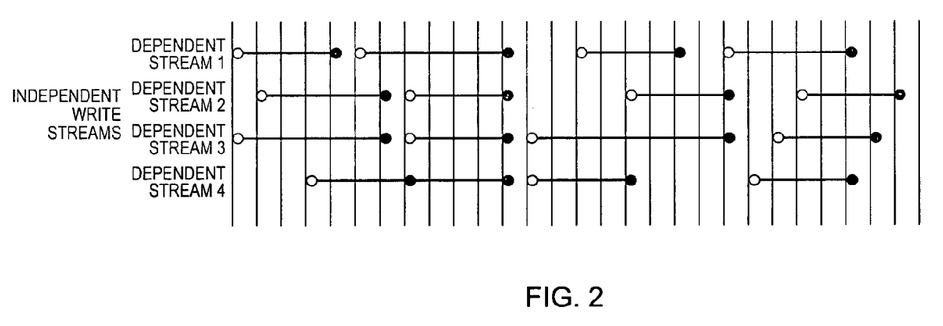
FIG. 2 is a representation of four independent write streams of dependent data as they are written to primary storage.
Figure 3:
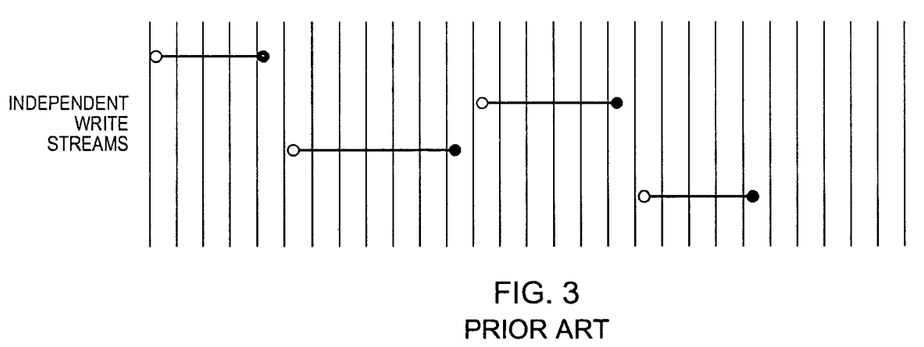
FIG. 3 is a representation of remote replication of data from the streams of FIG. 2 to remote storage in accordance with a prior art method of remote data replication.

Known remote replication algorithms maintain ordering of dependent writes through strict serialization of all write operations to disk, regardless of whether they are writes from independent streams. This strict serialization of writes significantly impacts application performance. For example, FIG. 2 shows an example of four write streams. A write operation is represented as beginning with a white circle and ending with a black circle. The vertical lines represent arbitrary time intervals. Each horizontal set of lines represents a dependent write stream, for example to the primary disk drives 18. The four sets of write streams are independent of each other. FIG. 3 shows the replication write operations that would be issued by a prior art semi-synchronous algorithm to the remote disk drives 24. Note that, first the first write operation for stream 1 is issued and completed. Then the first write operation for stream 3 is issued and completed. Then the first write operation for stream 2 is issued and completed, and so on. Strict ordering of dependent writes is preserved, but the performance impact is clear. All of these write operations are performed serially, even though they are independent of each other and could have been performed in parallel.

Figure 4:
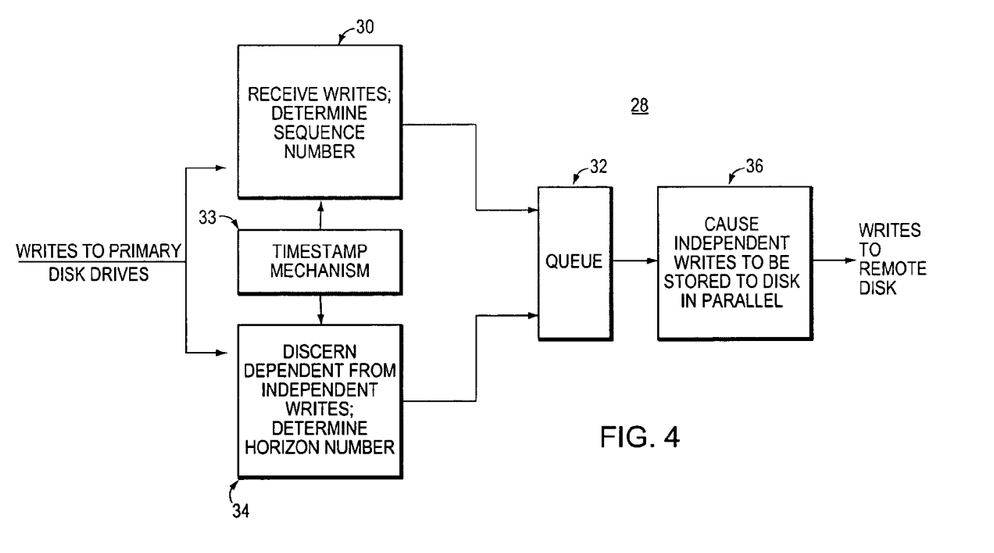
FIG. 4 is a block diagram showing the remote replication logic in accordance with the invention.

In contrast, the invention is able to distinguish between the different dependent write streams and replicate them in parallel. This provides significant improvements in application performance. As shown in FIG. 4, in a broad sense the remote replication logic 28 includes logic for receiving write operations 30 and storing them in a queue 32; logic for discerning the dependent from the independent writes 34; and logic for causing parallel storage of independent writes 36.

The invention utilizes two primary components:

An ordered queue 32 to store write operations that need to be applied to the remote copy A timestamp mechanism 33 with sufficient resolution to detect the relative ordering of dependent writes.

The timestamp mechanism 33 may be a local clock, an event counter, a Lamport clock in a distributed system, or the like. The resolution of the timestamp mechanism is chosen in accordance with design constraints so that the start interval and end interval of a write operation can be identified. The term "sequence number" will be used herein to represent the current value of this timestamp mechanism at any particular point in time.

Figure 5:
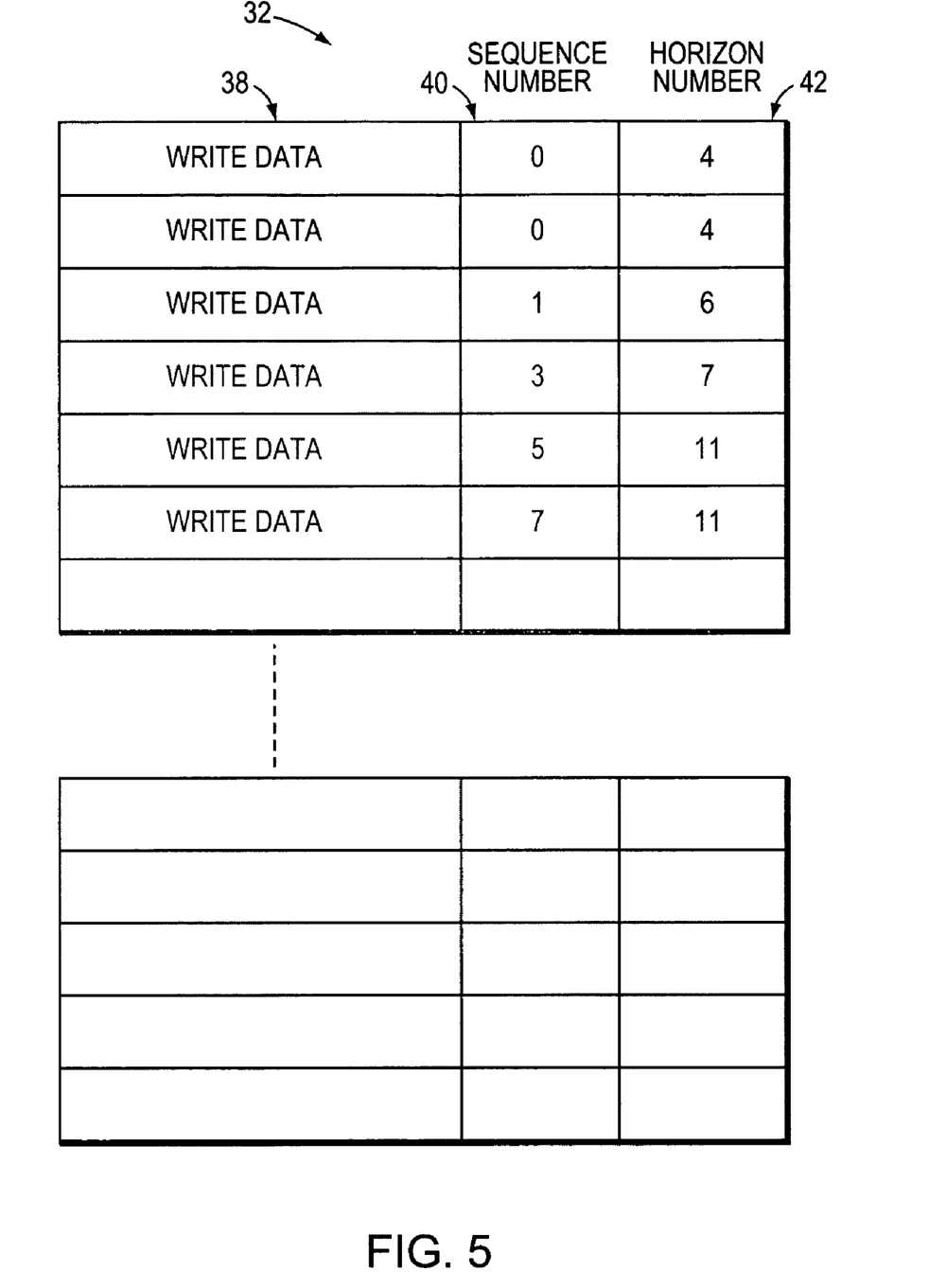
FIG. 5 is a representation of a queue used by the remote replication logic of the invention including write data, starting sequence numbers, and horizon sequence numbers.

Generally, referring to FIG. 5, the invention maintains two sequence numbers fore each write operation 38: the sequence number at which the write request was received, and the sequence number at which the write operation completed at the primary data center. The former is referred to as the write's "starting sequence number" 40. The latter is referred to as the write's "horizon sequence number" or "horizon number" 42. Combined, this information allows the method of the invention to detect overlapping writes, which, by definition, are independent. When updating the remote copy, this information is used to safely issue independent writes in parallel to improve performance over standard semi-synchronous algorithms while maintaining correctness.

The starting and horizon sequence numbers may be stored as entries associated with the writes in the queue 32, or may be stored separately. An implementation wherein the starting and horizon sequence numbers are stored in the queue 32 is shown in FIG. 5.

Figure 6:
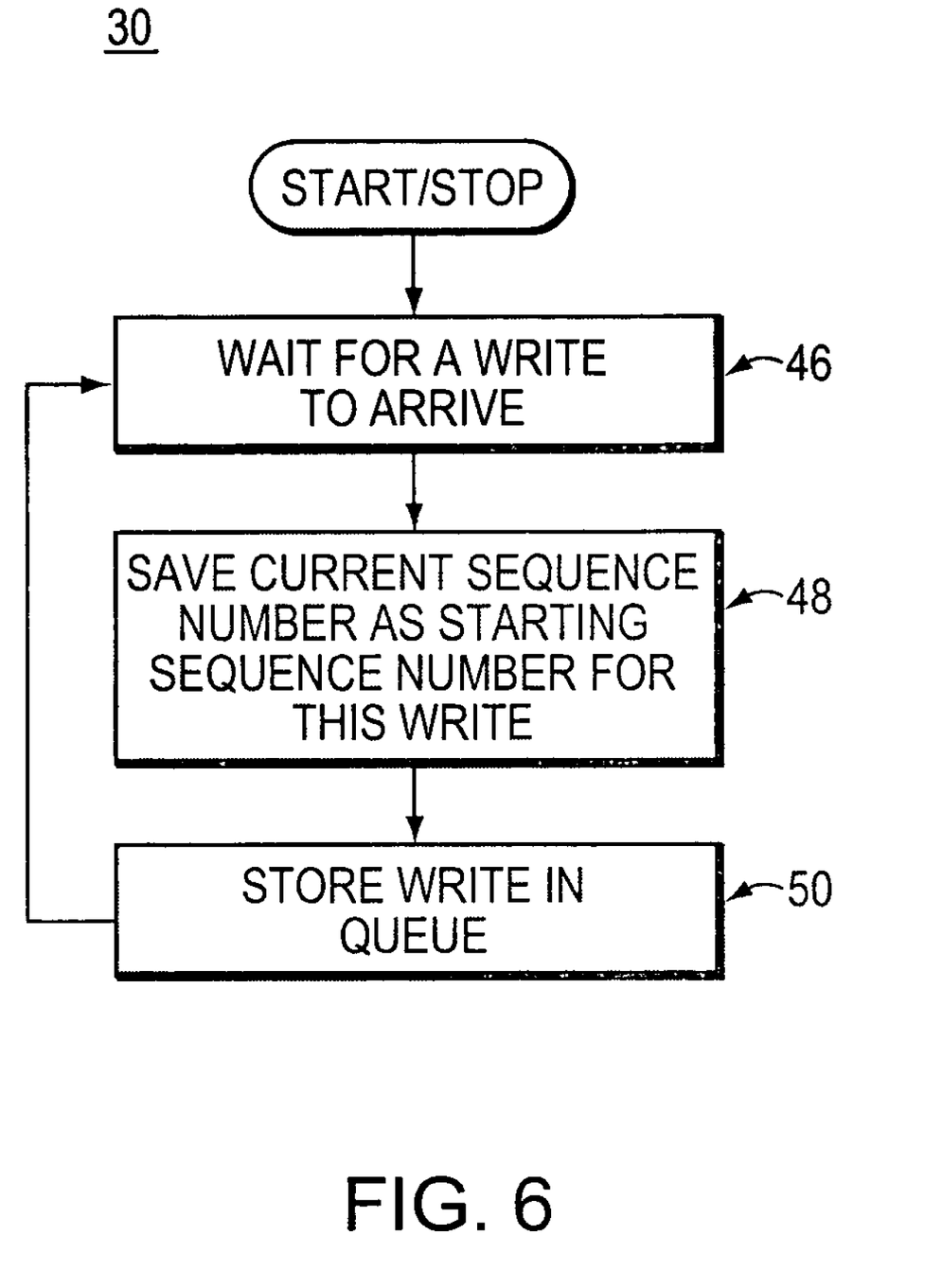
FIG. 6 is a flow diagram showing the process followed by the logic for receiving writes and determining starting sequence numbers.
Figure 7:
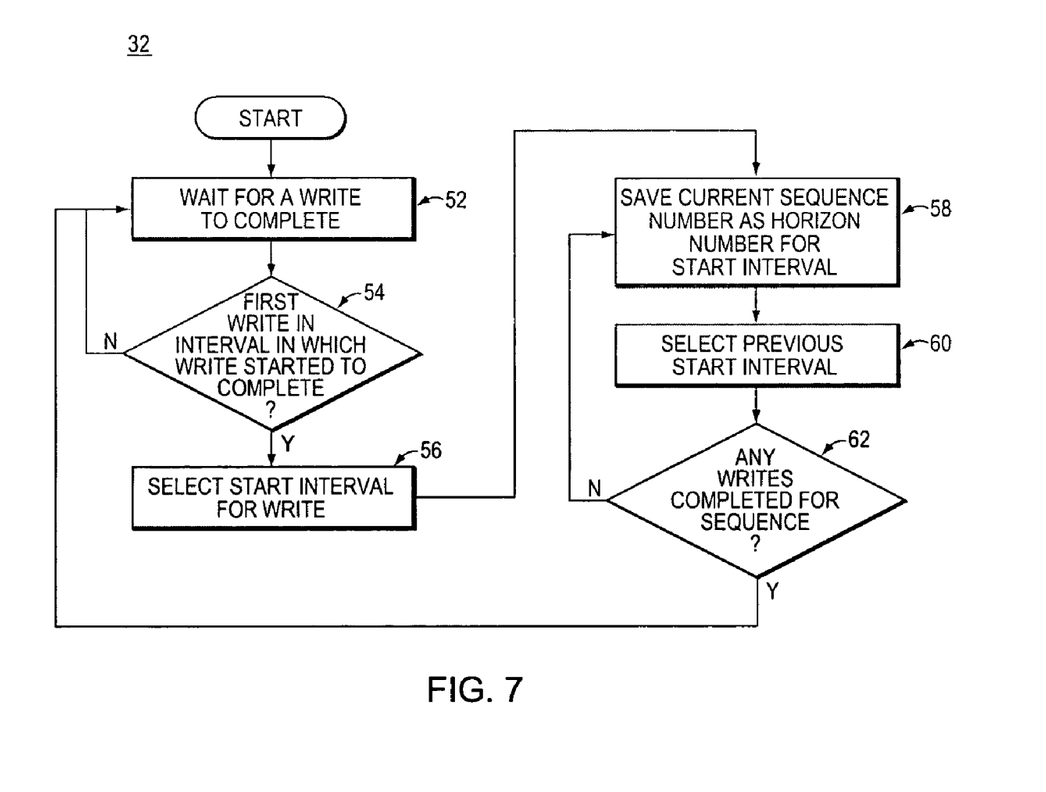
FIG. 7 is a flow diagram showing the process followed by the logic for discerning dependent from independent writes and determining horizon sequence numbers.
Figure 8:
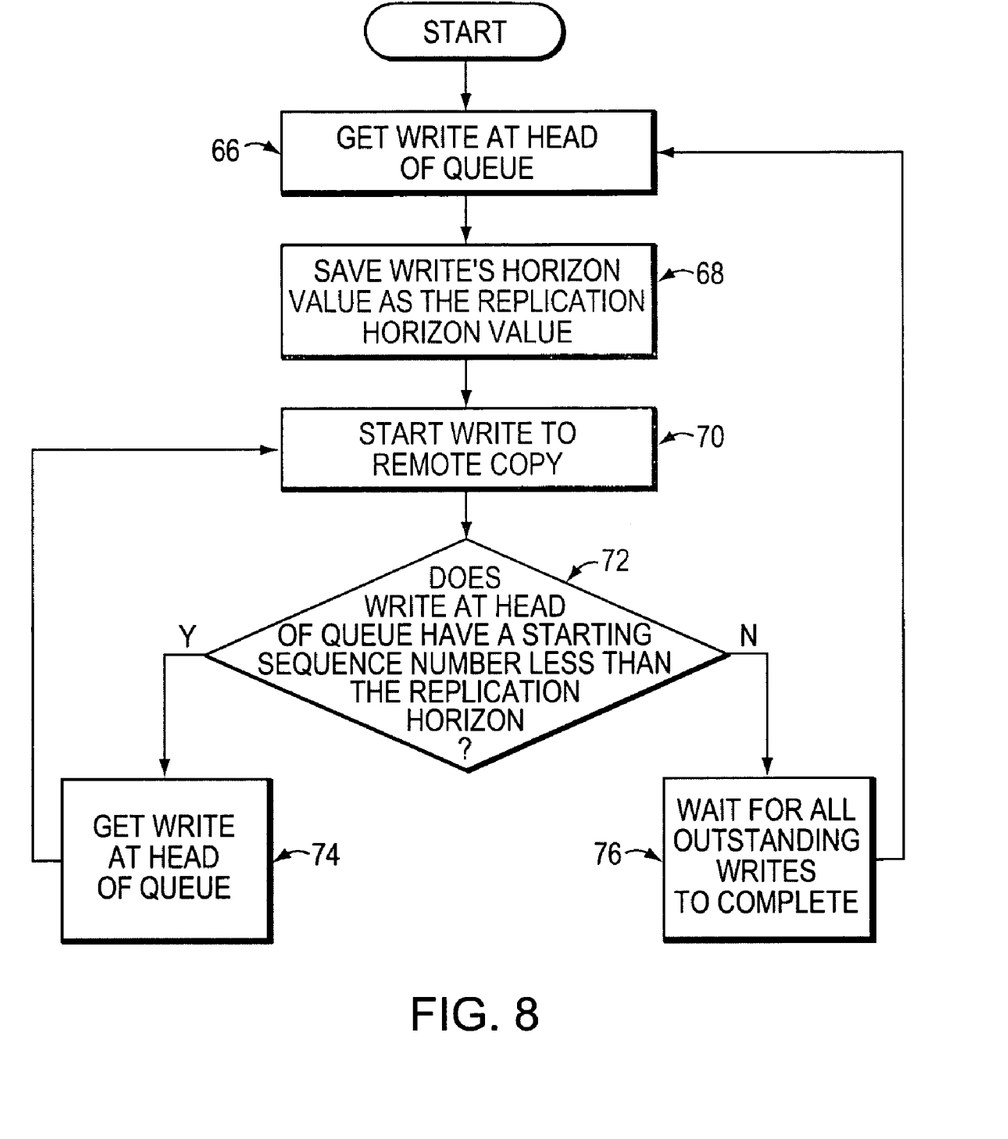
FIG. 8 is a flow diagram showing the process followed by the logic for causing independent writes to be stored to disk in parallel.

A preferred implementation of the remote replication method of the invention is shown in FIGS. 6-8. FIG. 6 shows the receive logic 30, and in particular the procedure for tagging and queuing writes. The process first waits for a write to arrive (step 46). The current sequence number is saved as the starting sequence number for the write (step 48). The write and its sequence number are then stored in the queue (step 50). If two writes arrive during the same time interval, both writes are stored in the queue with the same sequence number. For example, referring to FIG. 2, the first writes from streams 1 and 3 are stored in the queue with the starting sequence number "0", as shown in FIG. 5.

FIG. 7 shows a preferred implementation of the logic 34 for discerning dependent from independent writes, and more particularly for determining horizon numbers. First, the process checks interval by interval to ascertain whether a write has completed (step 52). When a write completes, the process checks to see if this is the first write in the interval in which the write began to complete (step 54). If it is not, the process continues to wait for other writes to complete. If it is the first write to complete, that starting interval is selected (step 56) and the current sequence number is saved as the horizon value for that interval (step 58). The previous interval is then selected (step 60). The process ascertains whether any writes were completed for that interval (step 62). If not, that sequence number is saved as the horizon number for that interval (step 58). When an interval is found in which a write was completed, the process returns to step 52 to wait for another write to complete. The examination of previous intervals ensures correctness in systems having non-uniform write latencies, as will be further exemplified.

Figure 9:
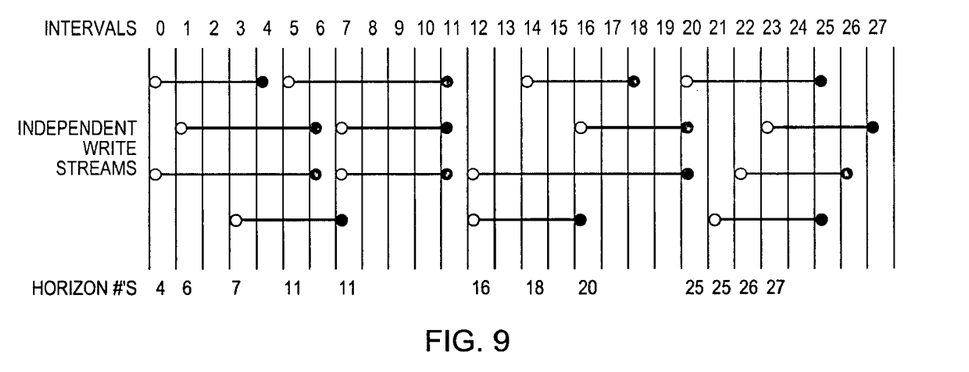
FIG. 9 is a representation of four independent write streams of dependent data as they are written to primary storage, as shown in FIG. 2, and further showing starting sequence numbers and horizon numbers.

Referring to FIG. 9, horizon numbers for writes are shown as determined in accordance with the above described process. In interval 0, two writes begin. The first write to finish ends in interval 4. The other write has not yet finished. So, the horizon number for the writes starting in interval 0 is set to 4. In interval 1, another write starts. It is the only write to start in this interval, and ends in interval 6. This write's horizon number is therefore set to 6. The next write starts in interval 3, and ends in interval 7, so its horizon value is set to 7. In interval 7, two writes start and both end in interval 11, so the horizon value is set to 11. As can be seen, all writes that start in a given interval share the same horizon number.

Figure 10:
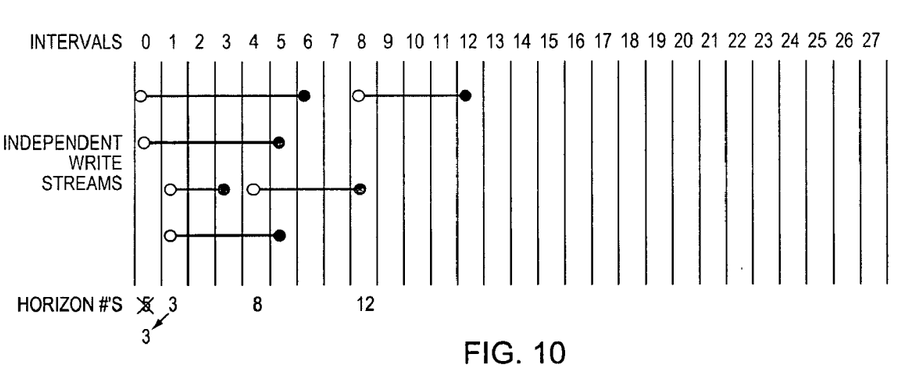
FIG. 10 is a representation of how starting sequence and horizon sequence numbers in a system having non-uniform write latencies.

In FIG. 10 there is shown a case that can occur in systems having non-uniform write latencies. A stream 3 write starts in interval 1 and ends in interval 3, before any of the writes that started in interval 0 end. In accordance with the process shown in FIG. 7, the horizon value for the stream 3 value is set to 3, the interval in which it ended. (Note the stream 3 write ended before the stream 4 write and therefore horizon value for the writes beginning in interval 1 is set to the interval in which the stream 3 write ended.) The interval previous to the stream 3 write, interval 0, is then checked to see if any writes ended there. None did, so the horizon value for writes in this interval is set to 3 also. In this manner, horizon numbers always monotonically increase. This ensures correctness, as will be further demonstrated.

Referring to FIG. 8, there is shown the process by which writes are issued to a remote copy in parallel while preserving ordering of dependent writes. To begin, the write at the head of the queue is retrieved, along with its starting sequence number and horizon number (step 66). The retrieved horizon number is saved as the "replication horizon number" or "replication number" (step 68). The write to the remote copy is then begun (step 70). The starting sequence number currently at the head of the queue is then checked to see if it is less than the replication number (step 72). If so, the write at the head of the queue is retrieved and issued to the remote copy (step 74). If it does not, the process waits for all outstanding writes to complete before issuing any more writes to the remote copy (step 76).

Figure 11:
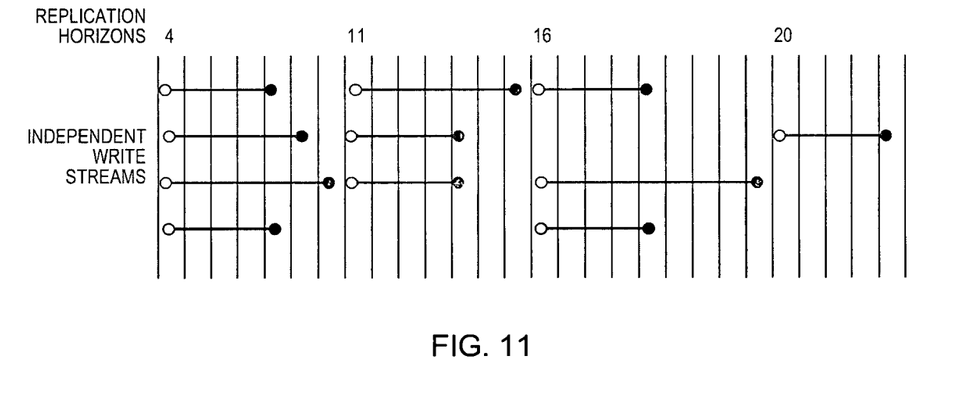
FIG. 11 is represents the result of the replication process of FIG. 8 as executed for the write pattern shown in FIG. 9.

The results of the replication process of FIG. 8 as executed for the write pattern shown in FIG. 9 (which is the same write pattern as was shown in FIG. 2) is shown in FIG. 11. The first write retrieved from the queue, the write in stream 1 of interval 0, has a horizon value of 4, which becomes the replication number. That write is issued. The other write in starting in interval 0 is also issued. The next write in the queue, the write starting in interval 1, has a starting sequence number (1) less than the replication number (4). This indicates that this write is a parallel write and it is therefore issued to the remote copy. The stream 4 write starting in interval 3 also has a starting sequence number less than the replication number and is therefore also issued. The write starting in stream 5 has a starting sequence number greater than the replication number, indicating that this may be a dependent write, therefore the process waits until all outstanding writes have completed before it issues another write.

Compare and contrast the results of the replication method of the invention, shown in FIG. 11, to the standard semi-synchronous result, shown in FIG. 3. The parallelism of remote copies provided by the invention provides a clear performance advantage over the standard solution.

Figure 12:
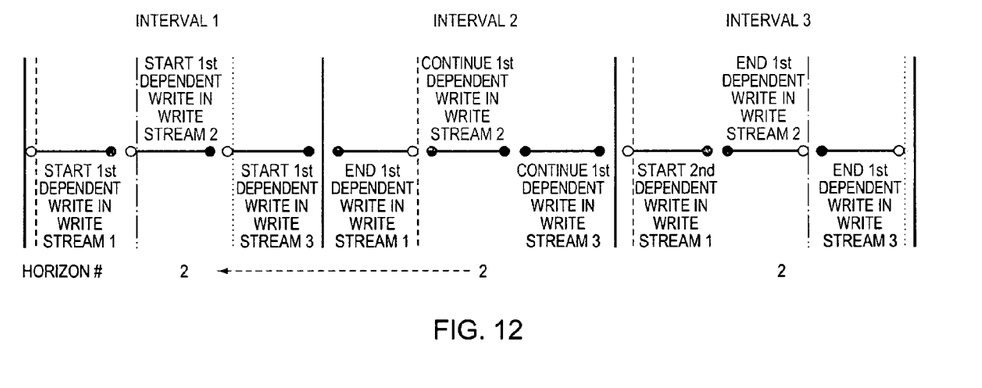
FIG. 12 represents the assignment of horizon sequence numbers for a serial write stream in which dependent writes are interleaved.

So far, for purposes of clarity, the invention has been described as receiving parallel independent streams of dependent writes. The invention also applies to write streams presented in other manners. First of all, a serial write stream might be received by the storage system 22 via the connection 26, and then divided into parallel independent streams of dependent writes. Or, the invention can operate on a serial write stream directly. In the case of a serial write stream, the separate dependent write streams would be interleaved amongst one another. An example of this case is shown in FIG. 12. In FIG. 12, white circles represent the start or end of a particular dependent write, and black circles indicate the continuation of that dependent write. Different types of dashed lines mark the start and end of a given dependent write. The process of the invention assigns the same horizon value for all writes in the same interval, and in all previous intervals for which a horizon value has not yet been defined. All three shown writes in FIG. 12 start in interval 1. No writes end in interval 1. A stream 1 dependent write ends in interval 2. So, "2" is assigned as the horizon number for intervals 1 and 2. Since the stream 3 write that ends in interval 3 started in interval 1, it is also assigned a horizon number of "2". The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, the remote replication logic 28 and its functions shown in FIGS. 6-8 may be implemented in software within the storage system 16. This software, though shown herein as a separate unit for clarity, may be embedded in and amongst other software. Alternatively, the replication logic 28 may be implemented in hardware, in for example an ASIC.

I claim:

1. A method of providing remote replication of data comprising the steps of:
   receiving a stream of data including independent streams of dependent writes;
   discerning dependent writes from independent writes; and
   causing writes from independent streams to be stored on a storage device in parallel until a dependent write in a stream needs to be stored on the storage device;
   wherein the step of discerning comprises the steps of:
      assigning a sequence number to each write, the sequence number indicating a time interval in which the write begins; and
      assigning a horizon number to each write, the horizon number indicating a time interval in which a first write that started at a particular sequence number ends;
   wherein the step of causing comprises the steps of:
      causing a write to be stored on a storage device and assigning the horizon number associated with the write as a replication number;
      causing another write to be stored on a storage device if the sequence number associated with the write is less than the replication number;
      waiting until all outstanding writes complete if the sequence number associated with the write is greater than the replication number.

2. The method of claim 1 further comprising the step of also assigning the horizon number to a previous write if no writes ended in the previous write's sequence number interval.

3. The method of claim 1 wherein a first set of servers and a local storage system reside at a primary data center;
   wherein receiving the stream of data includes obtaining, within the local storage system, application state information from the first set of servers;
   wherein a second set of servers and a remote storage system reside at a remote data center;
   wherein causing includes conveying the application state information to the remote storage system from the local storage system; and
   wherein the method further comprises, after the application state information is conveyed to the remote storage system from the local storage system, providing the application state information from the remote storage system to the second set of servers.

4. A method of providing remote replication of data comprising the steps of:
   receiving data including dependent and independent writes;
   storing each write received in a queue;
   assigning a sequence number to each write, the sequence number indicating a time interval in which the write begins;
   assigning a horizon number to each write request, the horizon number indicating a time interval in which a first write that started at a particular sequence number ends;
   removing a write from the queue and causing it to be stored on a storage device and assigning the horizon number associated with the write as a replication number;
   removing another write from the queue and causing it to be stored on the storage device if the sequence number associated with the write is less than the replication number; and
   also assigning the horizon number to a previous write if no writes ended in the previous write's sequence number interval.

5. The method of claim 4 wherein the step of removing another write from the queue further comprises the step of waiting until all outstanding writes complete if the sequence number associated with the write is greater than the replication number.

6. The method of claim 4 wherein the horizon number further represents an earliest time a dependent write ends.

7. The method of claim 4 wherein the step of receiving data including dependent and independent writes comprises receiving separate independent streams of dependent writes.

8. The method of claim 4 wherein the step of receiving data including dependent and independent writes comprises receiving a serial stream of data including dependent and independent writes.

9. The method of claim 4 wherein a first set of servers and a local storage system reside at a primary data center;
   wherein receiving data includes obtaining, within the local storage system, application state information from the first set of servers;
   wherein a second set of servers and a remote storage system reside at a remote data center;
   wherein removing a write from the queue includes conveying the application state information to the remote storage system from the local storage system; and wherein the method further comprises, after the application state information is conveyed to the remote storage system from the local storage system, providing the application state information from the remote storage system to the second set of servers.

10. A program product comprising a computer readable medium having embodied therein a computer program for storing data, the computer program comprising:
  logic for receiving a stream of data including independent streams of dependent writes;
  logic for discerning dependent writes from independent writes; and
  logic for causing writes from independent streams to be stored on a storage device in parallel until a dependent write in a stream needs to be stored on the storage device;
  wherein the logic for discerning comprises:
    logic for assigning a sequence number to each write, the sequence number indicating a time interval in which the write begins; and
    logic for assigning a horizon number to each write request, the horizon number indicating a time interval in which a first write that started at a particular sequence number ends;
  wherein the logic for causing comprises:
    logic for causing a write to be stored on a storage device and assigning the horizon number associated with the write as a replication number;
    logic for causing another write to be stored on the storage device if the sequence number associated with the write is less than the replication number; and
    logic for waiting until all outstanding writes complete if the sequence number associated with the write is greater than the replication number.

11. The computer program of claim 10 further comprising logic for also assigning the horizon number to a previous write if no writes ended in the previous write's sequence number interval.

12. The program product of claim 10 wherein a first set of servers and a local storage system reside at a primary data center;
  wherein the logic for receiving a stream of data includes logic for obtaining, within the local storage system, application state information from the first set of servers;
  wherein a second set of servers and a remote storage system reside at a remote data center;
  wherein the logic for causing includes logic for conveying the application state information to the remote storage system from the local storage system; and
  wherein the program product further comprises, logic for after the application state information is conveyed to the remote storage system from the local storage system, providing the application state information from the remote storage system to the second set of servers.

13. A program product comprising a computer readable medium having embodied therein a computer program for storing data, the computer program comprising:
  logic for receiving data including dependent and independent writes; logic for storing each write received in a queue;
  logic for assigning a sequence number to each write, the sequence number indicating a time interval in which the write begins;
  logic for assigning a horizon number to each write request, the horizon number indicating a time interval in which a first write that started at a particular sequence number ends;
  logic for removing a write from the queue and causing it to be stored on a storage device and assigning the horizon number associated with the write as a replication number;
  logic for removing another write from the queue and causing it to be stored on the storage device if the sequence number associated with the write is less than the replication number; and
  logic for also assigning the horizon number to a previous write if no writes ended in the previous write's sequence number interval.

14. The computer program of claim 13 wherein the logic for removing another write from the queue further comprises logic for waiting until all outstanding writes complete if the sequence number associated with the write is greater than the replication number.

15. The computer program of claim 13 wherein the horizon number further represents an earliest time a dependent write ends.

16. The computer program of claim 13 wherein the logic for receiving data including dependent and independent writes comprises logic for receiving separate independent streams of dependent writes.

17. The computer program of claim 13 wherein the logic for receiving data including dependent and independent writes comprises logic for receiving a serial stream of data including dependent and independent writes.

18. The program product of claim 13 wherein a first set of servers and a local storage system reside at a primary data center;
  wherein the logic for receiving data includes logic for obtaining, within the local storage system, application state information from the first set of servers;
  wherein a second set of servers and a remote storage system reside at a remote data center;
  wherein the logic for removing a write from the queue includes logic for conveying the application state information to the remote storage system from the local storage system; and
  wherein the program product further comprises, logic for after the application state information is conveyed to the remote storage system from the local storage system, providing the application state information from the remote storage system to the second set of servers.

19. Apparatus in a storage system for providing remote replication of data, the apparatus comprising:
  logic for receiving a stream of data including independent streams of dependent writes;
  logic for discerning dependent writes from independent writes; and
  logic for causing writes from independent streams to be stored on a storage device in parallel until a dependent write in a stream needs to be stored on the storage device;
  wherein the logic for discerning comprises:
    logic for assigning a sequence number to each write, the sequence number indicating a time interval in which the write begins; and
    logic for assigning a horizon number to each write request, the horizon number indicating a time interval in which a first write that started at a particular sequence number ends;
  wherein the logic for causing comprises:

logic for causing a write to be stored on a storage device and assigning the horizon number associated with the write as a replication number;

logic for causing another write to be stored on the storage device if the sequence number associated with the write is less than the replication number; and logic for waiting until all outstanding writes complete if the sequence number associated with the write is greater than the replication number.

20. The apparatus of claim 19 further comprising the step of also assigning the horizon number to a previous write if no writes ended in the previous write's sequence number interval.

21. The apparatus of claim 19 wherein a first set of servers and a local storage system reside at a primary data center;

wherein the logic for receiving a stream of data includes logic for obtaining, within the local storage system, application state information from the first set of servers;

wherein a second set of servers and a remote storage system reside at a remote data center;

wherein the logic for causing includes logic for conveying the application state information to the remote storage system from the local storage system; and wherein the apparatus further comprises, logic for after the application state information is conveyed to the remote storage system from the local storage system, providing the application state information from the remote storage system to the second set of servers.

22. Apparatus in a storage system for providing remote replication of data, the apparatus comprising:

logic for receiving data including dependent and independent writes;

logic for storing each write received in a queue;

logic for assigning a sequence number to each write, the sequence number indicating a time interval in which the write begins;

logic for assigning a horizon number to each write request, the horizon number indicating a time interval in which a first write that started at a particular sequence number ends;

logic for removing a write from the queue and causing it to be stored on a storage device and assigning the horizon number associated with the write as a replication number;

logic for removing another write from the queue and causing it to be stored on the storage device if the sequence number associated with the write is less than the replication number; and logic for also assigning the horizon number to a previous write if no writes ended in the previous write's sequence number interval.

23. The apparatus of claim 22 wherein the logic for removing another write from the queue further comprises logic for waiting until all outstanding writes complete if the sequence number associated with the write is greater than the replication number.

24. The apparatus of claim 22 wherein the horizon number further represents an earliest time a dependent write ends.

25. The apparatus of claim 22 wherein the step of receiving data including dependent and independent writes comprises logic for receiving separate independent streams of dependent writes.

26. The apparatus of claim 22 wherein the logic for receiving data including dependent and independent writes comprises logic for receiving a serial stream of data including dependent and independent writes.

27. The apparatus of claim 22 wherein a first set of servers and a local storage system reside at a primary data center;

wherein the logic for receiving data includes logic for obtaining, within the local storage system, application state information from the first set of servers;

wherein a second set of servers and a remote storage system reside at a remote data center;

wherein the logic for removing a write from the queue includes logic for conveying the application state information to the remote storage system from the local storage system; and wherein the apparatus further comprises, logic for after the application state information is conveyed to the remote storage system from the local storage system, providing the application state information from the remote storage system to the second set of servers.

* * * * *